Nov. 27, 1923.  1,475,685
G. M. CLARK
BOAT CARRIER FOR AUTOMOBILES
Filed Feb. 25, 1920    2 Sheets-Sheet 1
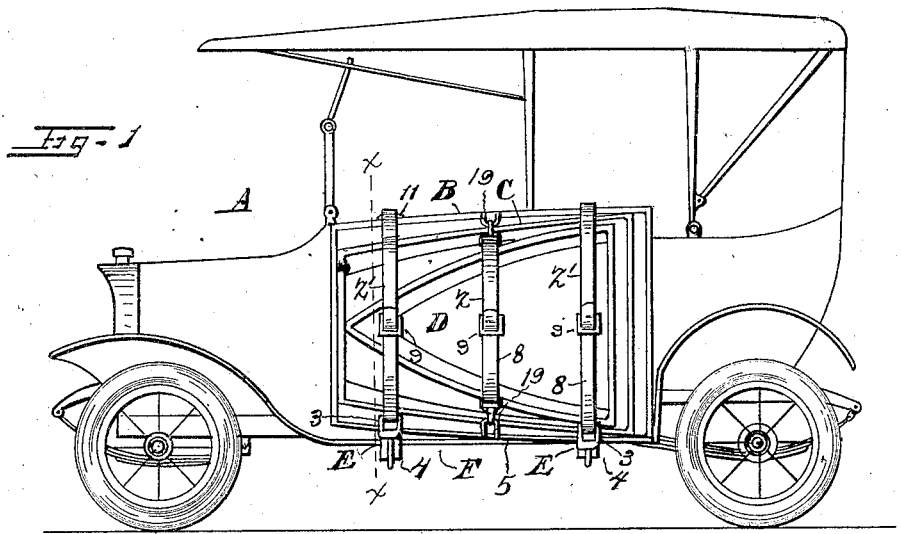
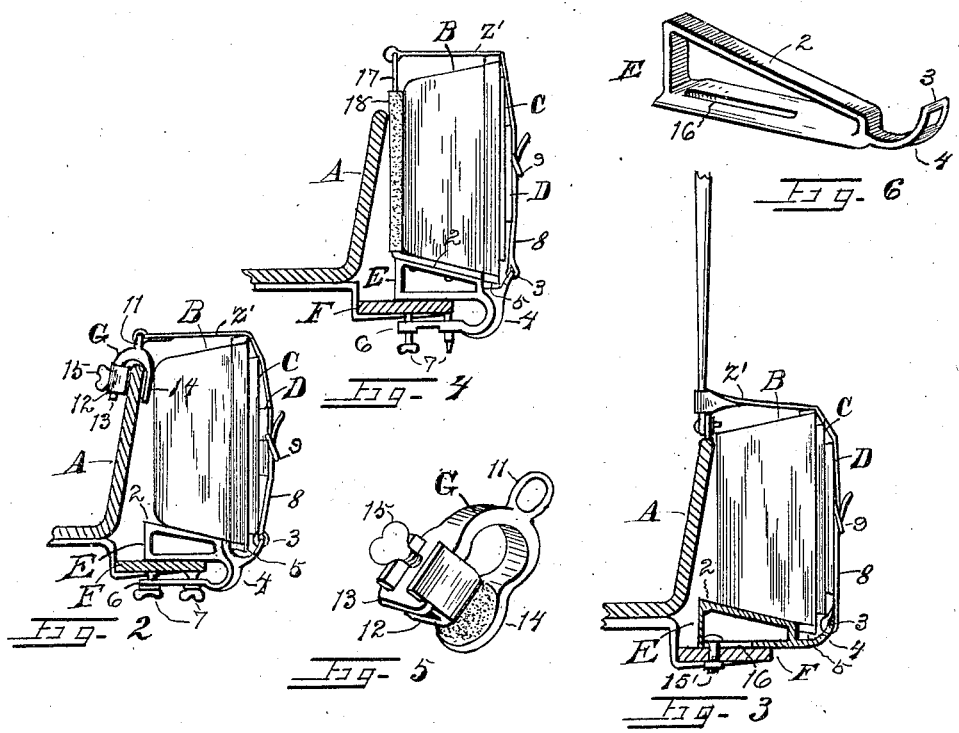
WITNESSES.
J. C. Richard.
Martee Dahlquist.
INVENTOR.
George M. Clark
Victor E. Randall
Atty.

Nov. 27, 1923. 1,475,685
G. M. CLARK
BOAT CARRIER FOR AUTOMOBILES
Filed Feb. 25, 1920 2 Sheets-Sheet 2
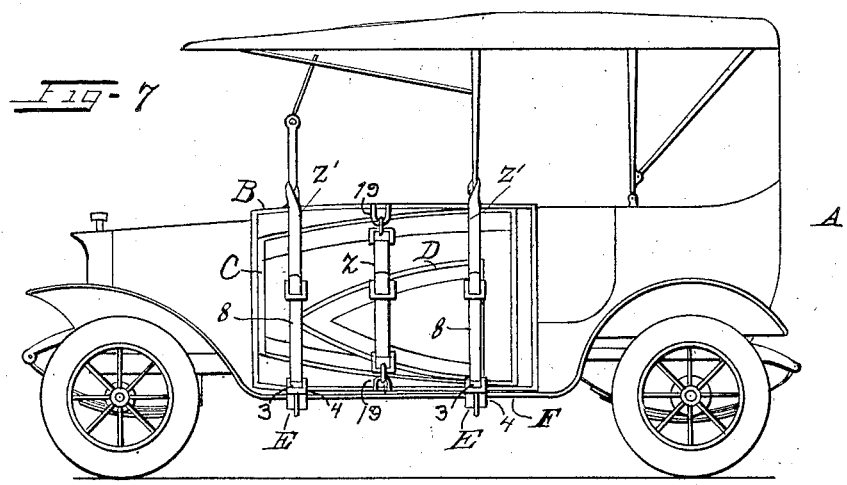
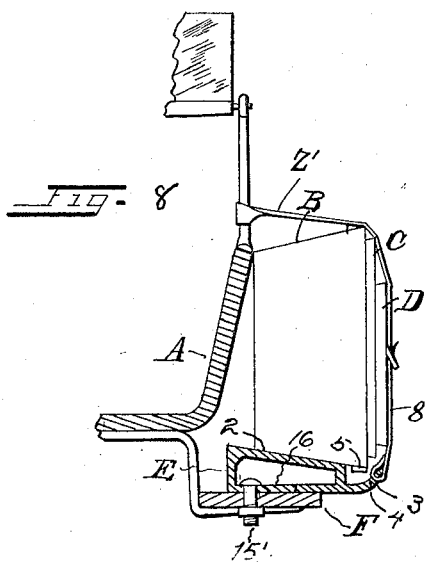
WITNESSES.
C.F. Richard.
Martee D. ahlquist.
INVENTOR.
George M Clark
By Victor E. Randall
Atty.

Patented Nov. 27, 1923.

1,475,685

UNITED STATES PATENT OFFICE.

GEORGE M. CLARK, OF BATTLE CREEK, MICHIGAN.

BOAT CARRIER FOR AUTOMOBILES.

Application filed February 25, 1920. Serial No. 361,326.

*To all whom it may concern:*

Be it known that I, GEORGE M. CLARK, a citizen of the United States, residing at Battle Creek, in the county of Calhoun and State of Michigan, have invented certain new and useful Improvements in Boat Carriers for Automobiles, of which the following description, with appended claims, taken in connection with the accompanying drawings, forms a specification.

The present invention relates to boat carriers for automobiles and more particularly relates to portable means for carrying nested sectional boats on the footboard of an automobile.

Among other objects, the present invention contemplates a series of adjustable portable clamping members capable of being readily attached to the footboard of an automobile and so shaped for receiving a boat of this character, that when the latter is placed thereon and strapped in position they will securely hold the same from displacement, and at the same time avoid vibration and noise from jolt while in transit.

Another object of the invention is to provide articles of the character that may be readily carried in the boot or tool box of an automobile or in a compartment of a boat, ready for instant use and requiring no special tools for their attachment.

Other objects and advantages are to provide a device of the class that may be attached to an automobile without injury thereto, that is simple in construction, capable of being attached or detached by a novice of ordinary intelligence, strong and enduring and capable of being manufactured at a minimum of expense. These and other objects and advantages will be readily comprehended by those familiar with the running of automobiles and the handling of boats, etc.

In the drawings forming a part of the specification, Figure 1 is a side view of an automobile having a set of my improved boat-holding carriers attached to the footboard and a sectional nested boat secured to said carriers ready for transit.

Fig. 2 is a detail broken end section of an automobile body and foot board looking toward the right in Fig. 1, at the line *x—x* showing a boat secured in position.

Fig. 3 is another broken cross section of an automobile body and foot board and a longitudinal section of a boat-holding bracket in modification, bolted to the footboard, with an attaching strap anchored at one end to the side bow of an automobile top and another strap to a lower forward portion of said bracket.

Fig. 4 is another broken end section of an automobile body and footboard, and another modified form of a boat-holding bracket clamped to the footboard and a boat securing strap attached at one end to an upright of said bracket and another strap secured to an outer lower end of said bracket.

Fig. 5 is a detail perspective view of a clamp to be placed over the edge of an automobile body or door top and provided with an eyelet or ring to which a snap strap or cord may be attached for holding a boat, as shown in Fig. 1.

Fig. 6 is a detail perspective view of a boat-holding bracket, as shown in Fig. 3.

Fig. 7 is a side view of an automobile having a set of my improved boat-holding carriers attached to the footboard and a sectional nested boat secured to said carriers, the strapping means extending over the boat and fastened at their ends with the wind shield standard and the top side supports.

Fig. 8 is a detail broken cross section of an automobile body and footboard showing an end view of a nested boat as strapped to a windshield frame.

In the drawings, like marks of reference refer to corresponding or equivalent parts in the different views in which A represents an automobile and B, C and D compartmental sections of a boat, the sections C and D being nested within the section B. To hold the boat sections in nested form, a strap *z*, or straps, pass over the open compartments and engage with rings 19 attached to the gunwales of the outer boat section.

Means for securing the nested sections of a boat together may include a strap or a series of straps or equivalent means with or without buckles or snaps, as expedient.

A boat having been thus assembled may be more conveniently handled, as the strap not only forms a handle but also prevents clatter of the assembled parts when placed edgewise on the brackets E, as shown.

The boat-holding brackets E in the main have rearwardly-sloping tops 2, their forward ends curving downwardly, thence outwardly and upwardly, and terminating in eyelets 3 for receiving a strap, rope or other binding element, or a snap to which a binding element may be attached, the offset curve 4 between the eyelet and sloping top forming a seat into which the gunwale 5 of the boat will neatly anchor.

The boat-holding brackets E in Fig. 1, and especially in Figs. 2 and 4, are formed with underly-curved extensions 6.

I employ at least two wing screws 7 in spaced alignment in the jaw of a bracket, that said bracket may be moved outwardly on the foot-board of an automobile and yet be capable of being secured by one of said screws.

An object in affording lateral adjustment of the bracket with a footboard is to permit boats of varying depths to be properly accommodated on the footboard of an automobile.

In Fig. 2 I have shown a clamp G attached to the edge of an automobile body. In some instances the clamp may also be attached to the upper end of an automobile door, the object of the clamp being to afford an easy, quick and secure anchor to which a strap, rope or other binding agency, $z'$, may be attached, and the other end of said strap, rope or binding agency pass over the boat, as in Fig. 2, and made fast to the outer end of the bracket E, as shown.

As shown, a strap $z'$ attached at one end to an eyelet 11, of the bracket G passes over the nested boat sections and by means of a buckle 9 at its opposite end, connects with a strap 8 secured through an eyelet 3 of the bracket E and firmly secures the nested boat sections to an automobile. The clamp G preferably has a movable follower 12 slidably guided by the upper lip 13 of said clamp. This follower is of U-shaped construction and is made to move toward the under or opposite jaw 14 of the clamp by means of a threaded wing screw 15 screw-threaded through said upper lip, as shown. Preferably the under surface of said follower and the inner surface of said jaw are padded to prevent marring or injury to a body when attached thereto.

In Fig. 3 the strap $z'$ is looped about the side bow of an automobile top in lieu of the clamp shown in Fig. 2. Instances also arise where the strap $z'$ can be employed to advantage by being secured to the windshield side of an automobile as shown in Fig. 7. In this modified form, also, the boat-holding bracket E is attached to the footboard F by means of a bolt 15' operating through slot 16 formed in the horizontal bottom of said bracket and extending through a hole made in said footboard, as shown. The slot 16 in the bracket allows sufficient latitude to accommodate differing depths of boats, and also provides for variations in the swell of automobile bodies by which a boat may be properly mounted in its brackets for transit.

In the modified form in Fig. 4, the bracket G carries an upright 17 over which a rubber tube or other cushion, 18, is placed to prevent rattling, and also protect the automobile body from injury when a boat is mounted for carrying. This upright may comprise a portion of the bracket G, and it may be attached thereto by any adequate means. As shown, the upper end of the upright has an eyelet or aperture, and through said aperture the strap $z'$ is secured.

In Fig. 1 the boat is shown as secured to the automobile with two brackets, and in this instance also the brackets are of differing heights to accommodate the curve of the boat's side and give a more pleasing appearance when a boat is loaded.

It would be evident that changes in minor details in the construction and also in the use of various materials could be resorted to in the manufacture of my improved boat-holding device, and I would be understood as entitled to such construction and minor details as would be compatible with the intent and spirit of my invention.

It is believed from the foregoing description and explanation of the operation and advantages disclosed, a more extended description of my invention is unnecessary.

Having, therefore, set forth my invention, what I claim as new and desire to secure by Letters Patent, is:—

1. In a device of the class set forth comprising detachable brackets mounted on the footboard of an automobile, said brackets having slotted portions lying transverse of said footboard and formed with inclined portions trending upwardly from the outer edge of said footboard, eyelets formed in the lower outer ends of said brackets, the inclined portions of said brackets adapted to receive the side of a boat with its gunwale toward said eyelets, and straps or equivalent means fastened through said eyelets and attached at their opposite ends to the windshield frame and side top supports of an automobile, and bolts extending through said foot-board and through said slots in said brackets and nuts run on said bolts whereby said brackets may be adjustably secured to said footboard, for the purpose set forth and described.

2. In devices of the class set forth comprising detachable brackets mounted on the footboard of an automobile, said brackets having slotted portions lying transverse of said footboard and formed with the inclined upper portions trending downwardly toward the forward ends of said brackets and toward the outer edges of said footboard, said inclined portions having downwardly offset portions terminating with upwardly extending eyelets, the inclined portions of said brackets adapted to receive the side of a boat and the offset portions the gunwale thereof, and straps or equivalent means fastened through said eyelets and attached at their opposite ends to both the windshield frame and the side top supports of an automobile, bolts extending from said footboard through said slots, and nuts run on said bolts whereby said brackets may be adjustably secured to said footboard, all arranged substantially as and for the purpose set forth.

3. The combination with the detachable brackets mounted on the footboard of an automobile and the straps or equivalent means attached at one end to the outer ends of said brackets and at their opposite ends to the windshield frame and the side top supports of an automobile, of a sectional boat in which one section will nest within another section, an outer section carrying oppositely-arranged eyelets and a strap or equivalent means connecting the eyelets of said outer boat section to retain the nested sections, said nested boat adapted to rest upon said brackets and between said automobile and secured thereto by the straps or equivalent means connecting said brackets with both the windshield frame and the side top supports of said automobile, as and for the purpose set forth.

GEORGE M. CLARK.

Witnesses:
F. G. EVANS,
P. J. ROSS.